UNITED STATES PATENT OFFICE.

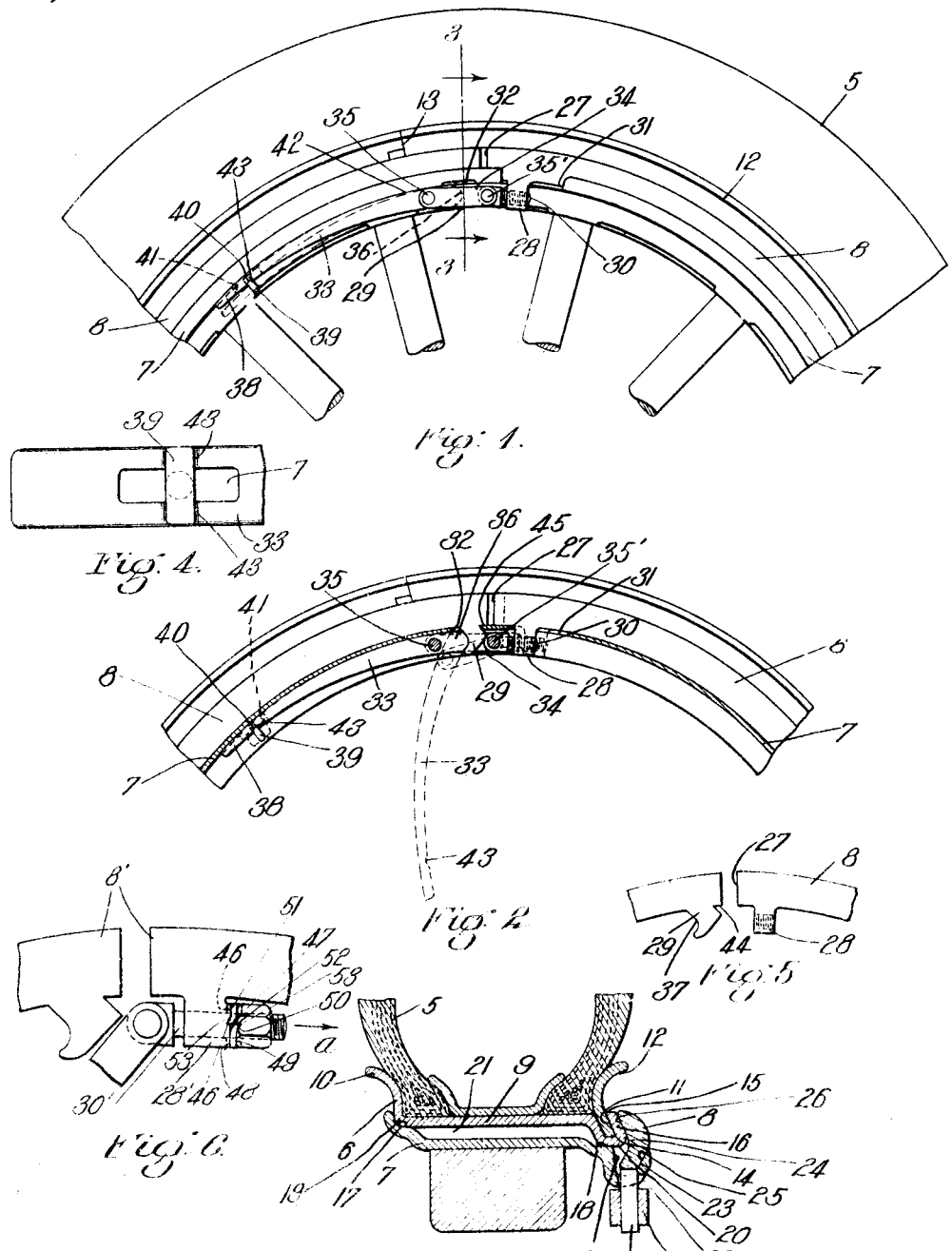

JAMES C. LEWIS, OF BROOKLINE, MASSACHUSETTS, ASSIGNOR TO PRESTO INTER-RIM COMPANY, OF BOSTON, MASSACHUSETTS, A CORPORATION OF MAINE.

RIM FOR VEHICLE-WHEELS.

1,127,785.  Specification of Letters Patent.  Patented Feb. 9, 1915.

Application filed October 3, 1913. Serial No. 794,151.

*To all whom it may concern:*

Be it known that I, JAMES C. LEWIS, a citizen of the United States, residing at Brookline, in the county of Norfolk and State of Massachusetts, have invented new and useful Improvements in Rims for Vehicle-Wheels, of which the following is a specification.

This invention relates to improvements in rims for vehicle wheels and particularly to rims used in connection with pneumatic tires, which consists of an expansible and contractible bead arranged within a groove in the permanent rim of the wheel to retain the tire in place thereon.

The object of the invention is to provide simple and compact means adapted to quickly and conveniently clamp said bead in place on said permanent rim.

The object is further to provide a device adapted to quickly and securely lock said bead clamping means.

The invention consists in the combination and arrangement of parts whereby the above objects and certain other objects hereinafter appearing may be attained as set forth in the following specification and particularly pointed out in the claims.

Referring to the drawings: Figure 1 is a partial side elevation of a vehicle wheel, illustrating portions of a rim, beads and tire together with the clamping device embodying my invention. Fig. 2 is a detail sectional view of the bead clamping device, parts of said bead and rim being broken away to save space and the dotted lines in said figure illustrating the unclamped position of said clamping means. Fig. 3 is a transverse section through a tire and rim taken on line 3—3 of Fig. 1. Fig. 4 is a detail plan view of a portion of a locking lever and button. Fig. 5 is a detail view of the adjoining ends of the clamping bead, portions of said bead being broken away to save space, in the drawings. Fig. 6 is a detail section of one end of a contractible bead illustrating a modified form of adjustable connection between the bead and bead contracting means.

Like numerals refer to like parts throughout the several views of the drawings.

In the drawings, 5 is a tire which may be of any of the well known types of tires and preferably arranged upon a demountable rim 6 and together with said demountable rim secured to a permanent rim 7 by means of an expansible and contractible bead 8. In the present instance, the demountable rim 6 is provided with a cylindrical body portion 9 having at one edge thereof an annular flange 10, while at the opposite edge of said body portion is provided an annular recess 11 into which fits a bead 12 split at 13 to permit said bead to be expanded when said tire is deflated, and removed whereby said tire may be removed from said demountable rim 6. Upon inflating said tire the inner lips will be forced outwardly by the pressure of the air and said bead will consequently be firmly wedged or held in place within the recess 11. To prevent said bead from being sprung from its groove 11 upon the inflating of said tire, said recess is slightly inclined away from the central plane of rotation of said tire as it approaches the axis of the wheel upon which said tire is mounted, thus causing the corner 14 of said bead to undercut the corner 15 of the flange 16 constituting the outer wall of said recess.

To properly position or support the demountable rim 6 on the permanent rim, said permanent rim is provided with circumferential surfaces 17 and 18 which are adapted to be engaged by the faces 19 and 20 respectively of said demountable rim and at opposite edges of said rim, providing a space 21 between said demountable rim 6 and permanent rim 7 which extends substantially across the face of said demountable rim. The permanent rim 7, preferably upon the same face of the wheel which includes the recess 11 and bead 12 is provided with an annular recess 22 whose outer wall 23 is inclined outwardly and away from the central plane of rotation of said tire. The bead 8 is arranged within said recess 22 and is provided with two inclined faces 24 and 25. The inclined face 24 thereof is arranged to engage the outer face 26 of the flange 16, said outer face being substantially parallel with the inclined surface 11, while the inclined face 25 of said bead is arranged to engage the inclined surface 23 of the outer wall of the annular recess 22, said faces 24 and 25 inclining in opposite directions.

The bead 8 is furthermore split at 27 permitting said bead to be expanded and contracted, said bead having adjacent the adjoining ends thereof, lugs 28 and 29. These lugs are preferably radially disposed relatively to the axis of said bead, while the lug 28 is adapted to carry a stud 30 having screw-threaded engagement therewith and arranged to be moved in the direction of the circumference of said bead for the purpose hereinafter set forth.

The lugs 28 and 29 are arranged in slots 31 and 32 respectively formed in the permanent rim 7, said slot 31 being open to the adjacent edge of the permanent rim 7 to facilitate the assembling of said bead within the recess 22. This slot is also slightly elongated to permit a circumferential movement of said lug 28 during the expansion or contraction of said bead. The other lug 29 is arranged within the slot 32 projecting therethrough to the inside of the rim and adapted to substantially fit said slot whereby said bead will be properly positioned circumferentially of said permanent rim.

Means are provided for contracting the bead 8 after the same has been placed within the recess 22, for the purpose of clamping said demountable rim 6 firmly upon said permanent rim with the surfaces 17 and 18 in contact with the surfaces 19 and 20 respectively, said clamping resulting from the contacting and wedging action between the surfaces 23 and 25 and the surfaces 24 and 26 which causes said demountable rim to be moved transversely of said permanent rim toward the left in Fig. 3. A lever 33 is pivotally connected by means of links 34 and pins 35 and 35' to the stud 30, said links being arranged upon opposite sides of said lever 33 and said stud 30, while said pin 35 is arranged at a distance from the rounded end 36 of said lever 33.

The lug 29 is slightly concaved at 37 to receive the rounded end 36 of the lever 33 and by placing said rounded end within said concavity and swinging the free end 38 of said lever outwardly against the inner periphery of the permanent rim 7, from the position indicated in dotted lines Fig. 2, to that illustrated in full lines in said figure the lugs 28 and 29 will be drawn toward each other and the bead 8 contracted and clamped within the recess 22. By this arrangement the lever 33 will be fulcrumed by said links 34 upon the stud 30, or in other words, said lever is fulcrumed upon said bead and detachable therewith, said slot 31 having been extended to the outer edge of said rim to clear said lever and its connecting links during the springing of said bead 8 into the recess 22. In placing said bead within said recess 22, as hereinbefore stated, the lug 29 substantially fits the slot 32 thereby preventing a circumferential movement of said lug 29 relatively to the permanent rim 7. This has been provided for the purpose of positioning the lever 33 in a certain position relatively to the permanent rim when said lever is moved outwardly to clamp or contract said bead and thereby causes said lever to occupy the same position relatively to said rim each time it is operated to contract the bead. To lock said lever in place against the inner periphery of said permanent rim, the point of contact between the end 36 of the lever 33 and the lug 29 is preferably slightly inside of and out of alinement with a plane containing the axes of the studs 35 and 35', while to still further retain said lever against said rim a button 39 is arranged to swivel on said rim with the inner face 40 thereof at a slight distance from the face of said rim. A slot 41 extending longitudinally of the free end of the lever 33 is arranged to register with said button 39 when said button is turned with its long dimension extending circumferentially relatively to said rim. This permits said lever to be moved to contact with the permanent rim and while in said contacting position said button may be turned at right angles from the position hereinbefore mentioned to that shown in Fig. 1, or with its long dimension extending transversely of said rim thus locking said lever against said rim. To prevent the jarring loose of said lever while in its locked position the free end 38 thereof is made slightly resilient and as said lever is swung outwardly toward said rim it is adapted to contact with said rim substantially at a point 42 and in order to move the extremity of said lever far enough to permit the button 39 to be rotated said lever must be slightly deflected.

In the outer face of the lever 33 a transverse slot or notch 43 is provided into which the inner face 40 of the button 39 is adapted to rest, when said button is turned to the position illustrated in Fig. 1, and said notch together with the pressure caused by the springing of said lever positively prevents the unlocking or working loose of said parts. During the contracting operation of said bead, or at least at the beginning of said operation, the pressure of the lever 33 against the lug 29 will be substantially in the direction of the rim or outwardly and at this time there will be a tendency of said lug 29 to push back through the slot 32. As a safeguard to prevent the movement hereinbefore stated the lug 29 is notched at 44 and into this notch a spur 45 on the permanent rim is adapted to project.

To increase or diminish the contraction of the bead 8 the lever 33 may be released by the button 43 and the end of said bead, including the lug 28, sprung outwardly from the recess 22, or said bead may be entirely removed, if desired, and the stud 30 to which the links 34 are attached may be rotated and moved in one direction or the other circumferentially of said bead which will cause the adjacent ends of said band to be separated or drawn together according to the movement of said stud.

Fig. 6 illustrates positive means for adjusting the expansible and contractible head which permits the same to be adjusted without releasing the head contracting device and preferably consists in forming a series of notches 16 in one face of the lug 25'. A stud 30' is arranged in said lug 25' to be moved lengthwise thereof by a nut 17 having screw-threaded engagement with said stud 30' which is also arranged near one end to the face 18 of said lug 25'. The face 18 of the nut 17 adjacent the face 18 is also provided with notches 16 disposed in opposite direction to the notches 16 which are disposed between the face 18 and the face 19 of said washer 31, said spring washer having a radially disposed slit 32 at one side thereof, the ends thereof being sprung apart in opposite directions parallel to the median axial line of said stud to form spurs 33 which engage the notches 16 and 16 respectively. In entering the nut 17 to one position to force the said 30' through the lug 25', in the direction of the arrow 20, the spurs 33 will yield and permit a positive movement between said nut and said lug, said movement causing a tightening or contracting of the band 8. The formation of the notches 16 and 16 and the spurs 33 prevents the rotation of the nut 17 in a reverse direction to expand said band, consequently there will be no danger of the nut 17 losing its set as a result of the vibrations of the wheel.

Having thus described my invention what I claim and desire by Letters Patent to secure is:—

1. The combination with a rim and the like of a band mounted on said rim, a pair of lugs on said band adapted to engage with said a lever links connecting said lever with one of said lugs and constituting a fulcrum for said lever, the other lug adapted to be engaged by one of the ends of said lever and upon the rocking of said lever outwardly against said rim, to draw said lugs together whereby said band will be contracted, the other end of said lever being resilient, and provided with a slot adjacent the extremity thereof, a button mounted to swivel on said rim adapted to enter said slot upon the deflection of the resilient end of said lever and lock said lever against said rim.

2. The combination with a rim of a band mounted on said rim, a pair of lugs on said band, a lever pivotally connected with one of said lugs, the other of said lugs adapted to be engaged by one of the ends of said lever whereby said lugs may be drawn together and said band contracted, a portion of said lever provided with a slot adjacent the extremity thereof, a button mounted to swivel on said rim adapted to enter said slot and upon the deflection of the resilient end of said lever to be rotated about its axis into a position transversely of and engaging said lever and lock the same against said rim, and means to lock said button in a transverse position relatively to said lever.

3. The combination with a rim of a band mounted on said rim, a pair of lugs on said band, a lever pivotally connected with one of said lugs, the other of said lugs adapted to be engaged by one of the ends of said lever whereby said lugs may be drawn together and said band contracted, a portion of said lever provided with a slot adjacent the extremity thereof, a button mounted to swivel on said rim adapted to enter said slot and upon the deflection of the resilient end of said lever to be rotated about its axis into a position transversely of and engaging said lever and lock the same against said rim, said lever having depressions arranged at opposite sides of said slot and in alignment with the ends of said stud and in alignment with the ends of said button, said depressions adapted to be engaged by said button which said button is engaged by said button whereby said button will be held in said transverse position.

4. The combination of a rim provided with a pair of axially disposed slots, an expansible and contractible band provided with a pair of lugs, one of said lugs adapted to project through and fit one of said slots to prevent a circumferential movement of said lug relatively to said rim, the other of said lugs adapted to project through the other of said slots and be moved thereon circumferentially of said rim a predetermined distance, a stud having slidable engagement with said lugs, a nut adapted to be rotated adjacent one face of said lug to move said stud through said lugs opposite faces of said lug and said nut respectively, a plurality of notches disposed radially of said adjacent faces, a spring washer radially disposed between said nut and said lug having a radially disposed slot, the ends of said washer being sprung apart in opposite directions parallel to the median axial line of said stud to form spurs, said spurs adapted to engage the notches in said lug and said nut respectively to prevent the rotation of said nut relatively to said lug in one direction, a lever pivotally connected to said stud adapted to engage the other of said lugs to contract said bead, and means to lock said lever in a position to retain said bead contracted.

In testimony whereof I have hereunto set my hand in presence of two subscribing witnesses.

JAMES C. LEWIS.

Witnesses:
 CHARLES S. GOODING,
 SYDNEY E. TAFT.